United States Patent
Pei et al.

(10) Patent No.: US 11,308,587 B2
(45) Date of Patent: Apr. 19, 2022

(54) LEARNING METHOD OF GENERATIVE ADVERSARIAL NETWORK WITH MULTIPLE GENERATORS FOR IMAGE DENOISING

(71) Applicants: UNIVERSITY OF SHANGHAI FOR SCIENCE AND TECHNOLOGY, Shanghai (CN); YUNWU NETLINK (SUZHOU) INTELLIGENT TECHNOLOGY CO., LTD, Suzhou (CN)

(72) Inventors: Songwen Pei, Shanghai (CN); Jing Fan, Shanghai (CN)

(73) Assignee: University of Shanghai for Science and Technology, Shanghai (CN)

( * ) Notice: Subject to any disclaimer, the term of this patent is extended or adjusted under 35 U.S.C. 154(b) by 0 days.

(21) Appl. No.: 17/288,933

(22) PCT Filed: Sep. 29, 2020

(86) PCT No.: PCT/CN2020/118697
§ 371 (c)(1),
(2) Date: Apr. 27, 2021

(87) PCT Pub. No.: WO2021/077997
PCT Pub. Date: Apr. 29, 2021

(65) Prior Publication Data
US 2022/0092742 A1 Mar. 24, 2022

(30) Foreign Application Priority Data
Oct. 23, 2019 (CN) .......................... 201911012057.2

(51) Int. Cl.
*G06T 5/00* (2006.01)
*G06N 3/04* (2006.01)

(52) U.S. Cl.
CPC ............... *G06T 5/002* (2013.01); *G06N 3/04* (2013.01); *G06T 2207/10081* (2013.01); *G06T 2207/20081* (2013.01); *G06T 2207/20084* (2013.01)

(58) Field of Classification Search
CPC .......... G06T 5/002; G06T 2207/10081; G06T 2207/20081; G06T 2207/20084; G06N 3/04
See application file for complete search history.

(56) References Cited

U.S. PATENT DOCUMENTS 10,925,568 B2 * 2/2021 Lu .......................... G06T 11/003
2019/0286950 A1 * 9/2019 Kiapour .............. G06F 16/9535
(Continued)

FOREIGN PATENT DOCUMENTS

CN     108171266 A     6/2018
CN     108765319 A     11/2018
(Continued)

OTHER PUBLICATIONS

International Search Report in PCT/CN2020/118697, issued by ISA, dated Dec. 30, 2020.
(Continued)

*Primary Examiner* — Ping Y Hsieh
(74) *Attorney, Agent, or Firm* — Zhu Lehnoff LLP

(57) ABSTRACT

The present invention relates to a learning method of generative adversarial network (GAN) with multiple generators for image denoising, and provides a generative adversarial network with three generators. Such generators are used for removing Poisson noise, Gaussian blur noise and distortion noise respectively to improve the quality of low-dose CT (LDCT) images; the generators adopt the residual network structure. The mapped short connection used in the residual network can avoid the vanishing gradient problem in a deep
(Continued)

neural network and accelerate the network training; the training of GAN is always a difficult problem due to the unreasonable measure between the generative distribution and real distribution. The present invention can stabilize training and enhance the robustness of training models by limiting the spectral norm of a weight matrix.

1 Claim, 3 Drawing Sheets

(56) References Cited

U.S. PATENT DOCUMENTS

2020/0349449 A1* 11/2020 Wang ................ G06T 11/00
2021/0350934 A1* 11/2021 Kinsey ............... G16H 50/70

FOREIGN PATENT DOCUMENTS

| CN | 108765334 A | 11/2018 |
| CN | 109978165 A | 7/2019 |
| CN | 110827216 A | 2/2020 |

OTHER PUBLICATIONS

Written Opinion of the International Search Report in PCT/CN2020/118697, issued by ISA, dated Dec. 30, 2020.

* cited by examiner

LEARNING METHOD OF GENERATIVE ADVERSARIAL NETWORK WITH MULTIPLE GENERATORS FOR IMAGE DENOISING

TECHNICAL FIELD

The present invention relates to an image processing technique, in particular to a learning method of generative adversarial network (GAN) with multiple generators for image denoising.

BACKGROUND

Since its inception, X-ray computed tomography (CT) has made great contributions to the medical field. CT scan takes X-ray images from different angles of a human body, and utilizes computer processing to generate cross-sectional images (slices) of blood vessels, bones, soft tissues and the like. CT images have a wide range of applications. For example, scanning allows diagnosis of bone tumors, internal injuries and internal bleeding, which cannot be directly observed with people's eyes. CT technology has attracted the attention of people to radiation leaks although it brings many benefits. The probability of inducing cancer and suffering from genetic diseases is increased significantly as the dose of radiation to a patient is multiplied. In order to solve this problem, relevant organizations have used the as low as reasonably achievable (ALARA) principle to protect patients from excessive radiation.

Reduction of radiation dose will increase the CT image noise and produce blocky and waxy artifacts in CT images, which will affect doctors' correct, effective diagnosis. At present, people have been committed to low-dose CT (LDCT) image denoising and achieved ideal results through various techniques. Denoising techniques include sinogram filters [1]-[3] before reconstruction, iterative reconstruction [4]-[5], and image processing after reconstruction [6]-[8]. Nowadays, the most widely concerned one in various techniques is the deep learning method.

A deep learning model contains a multi-layer neural network that can learn complex data representation through different levels of feature extraction. A deep network, especially a convolutional neural network (CNN), can detect complex structures in high-dimensional data, so the deep neural network has been successfully applied to image, video, voice processing and other important fields. CNN has made a major breakthrough in computer vision since the 21st century. In the past few years, there were many researches devoted to the processing of LDCT images. A deep convolutional neural network was used to solve the problem of image super-resolution [9]. Then a variety of hybrid architectures were proposed to deal with the problem of LDCT denoising, for example, RED-CNN [10]. RED-CNN combined an autocoder, a deconv network and a short connection to replace the pooling layer of U-net. Finally, directional wavelet application transform was used to extract the directional component of artifacts [11].

Although various innovations have achieved remarkable outcomes. There are still some inherent defects in LDCT image denoising so far. As everyone knows, the LDCT image mainly contains Poisson noise, Gaussian blur, distortion and other noises. If the loss value of each pixel between the generated image and the normal dose CT (NDCT) image is directly minimized in the experiment, the result of denoising tends to produce excessively smooth edges. The method based on the mean square error (MSE) loss uses a high-resolution patch, which uses the Euclidean distance instead of the geodesic distance. In this case, the experimental results often ignore subtle image features and are not visually attractive to people. In addition, the denoised image often introduces artifacts, especially in non-uniform deviation.

[1] Wang, Jing, Hongbing Lu, Tianfang Li, and Zhengrong Liang. "Sinogram noise reduction for low-dose CT by statistics-based nonlinear filters." In Medical Imaging 2005: Image Processing, vol. 5747, International Society for Optics and Photonics, pp. 2058-2067, 2005.
[2] Wang, Jing, Tianfang Li, Hongbing Lu, and Zhengrong Liang. "Penalized weighted least-squares approach to sinogram noise reduction and image reconstruction for low-dose X-ray computed tomography." IEEE transactions on medical imaging 25, no. 10, pp. 1272-1283, 2006.
[3] Manduca, Armando, Lifeng Yu, Joshua D. Trzasko, Natalia Khaylova, James M. Kofler, Cynthia M. McCollough, and Joel G. Fletcher. "Projection space denoising with bilateral filtering and CT noise modeling for dose reduction in CT." Medical physics 36, no. 11, pp. 4911-4919, 2009.
[4] Beister, Marcel, Daniel Kolditz, and Willi A. Kalender. "Iterative reconstruction methods in X-ray CT." Physica medica 28.2, pp. 94-108, 2012.
[5] Hara, Amy K., Robert G. Paden, Alvin C. Silva, Jennifer L. Kujak, Holly J. Lawder, and William Pavlicek. "Iterative reconstruction technique for reducing body radiation dose at CT: feasibility study." American Journal of Roentgenology, vol. 193, no. 3, pp. 764-771, 2009.
[6] Ma, Jianhua, Jing Huang, Qianjin Feng, Hua Zhang, Hongbing Lu, Zhengrong Liang, and Wufan Chen. "Low-dose computed tomography image restoration using previous normal-dose scan." Medical physics 38, no. 10, pp. 5713-5731, 2011.
[7] Chen, Yang, Xindao Yin, Luyao Shi, Huazhong Shu, Limin Luo, JeanLouis Coatrieux, and Christine Toumoulin. "Improving abdomen tumor low-dose CTimages using a fast dictionary learning based processing." Physics in Medicine and Biology 58, no. 16, pp. 5803, 2013.
[8] Feruglio, P. Fumene, Claudio Vinegoni, J. Gros, A. Sbarbati, and R. Weissleder. "Block matching 3D random noise filtering for absorption optical projection tomography." Physics in Medicine and Biology 55, no. 18, pp. 5401, 2010.
[9] Dong, Chao, Chen Change Loy, Kaiming He, and Xiaoou Tang. "Image super-resolution using deep convolutional networks." IEEE transactions on pattern analysis and machine intelligence 38, no. 2, pp. 295-307, 2015.
[10] Chen, Hu, Yi Zhang, Mannudeep K. Kalra, Feng Lin, Yang Chen, Peixi Liao, Jiliu Zhou, and Ge Wang. "Low-dose CT with a residual encoder decoder convolutional neural network." IEEE transactions on medical imaging 36, no. 12, pp. 2524-2535, 2017.
[11] Kang. Eunhee, Junhong Min, and Jong Chul Ye. "A deep convolutional neural network using directional wavelets for low dose X-ray CT reconstruction." Medical physics, 44(10), pp. 360-375, 2017.

SUMMARY OF THE INVENTION

In order to solve the problems in LDCT image denoising, the present invention provides a learning method of generative adversarial network (GAN) with multiple generators for image denoising, in which three generators are trained to improve the quality of low-dose CT (LDCT) images, and the network can obtain more efficient training and better convergence performance by using ResNet and spectral normalization.

The technical solution of the present invention is as follows: A learning method of generative adversarial network (GAN) with multiple generators for image denoising, wherein a LDCT image represents a low-dose CT image, and a NDCT image represents a normal-dose CT image; it specifically comprises the following steps:

1) Constructing an adversarial network structure: The adversarial network comprises three different generators G1, G2, G3 and a discriminator D, wherein G1, G2 and G3 are generators for removing Gaussian blur noise, Poisson quantum noise and distortion noise respectively, and the discriminator D is used for discriminating real and generated images; both the generators and the discriminator adopt the neural network structure, and G1, G2 and G3 adopt the residual network structure, with independent parameters;

2) Generators: The LDCT image, serving as a sample, is correspondingly inputted into three generators according to the weights $\lambda_1$, $\lambda_2$ and $\lambda_3$ of the generators, wherein the generated image outputted by the G1 generator enters the discriminator D and preprocessed $\lambda_1 D_{23}$ for calculation of pixel loss, and also adds the generated images of G2 and G3 to generate a new generator image, which, together with the NDCT image, is used as the input of the discriminator D; the same is true for the other two generators.

$D_{23}$ is a sample of image distribution with Poisson quantum noise and distortion added to the NDCT image where G1 is a generator for Gaussian blur denoising; $D_{13}$ is a sample of image distribution with Gaussian blur and distortion added to the NDCT image where G2 is a generator for Poisson quantum denoising; $D_{12}$ is a sample of image distribution with Gaussian blur and Poisson quantum noise added to the NDCT image where G3 is a generator for distortion denoising;

3) Discriminator: To keep the image generated by the generator and its corresponding NDCT image as approximate as possible so that the discriminator is successfully cheated, the adversarial loss function $L_a$ (consisting of the generator loss and the discriminator loss) is minimized, and the loss function of the whole discriminator is as follows:

$$Loss = L_G + L_{p1} + L_{p2} + L_{p3}$$

$$L_a = \sup_{\|f\|_L \leq 1} \sum_{i=1}^{3} [E_{s \sim \lambda_i P_r} f(s) - E_{t \sim P_{gi}} f(t)]$$

$$L_{p1} = \mu_1 E[\|G_1(\lambda_1 z) - \lambda_1 D_{23}\|_2]$$

$$L_{p2} = \mu_2 E[\|G_2(\lambda_2 z) - \lambda_2 D_{13}\|_2]$$

$$L_{p3} = \mu_3 E[\|G_3(\lambda_3 z) - \lambda_3 D_{12}\|_2]$$

where $L_a$ represents adversarial loss function; $\lambda_1 + \lambda_2 + \lambda_3 = 1$; $f(x)$ is the 1-Lipschitz function; $E_{s \sim \lambda_i P_r} f(s)$ represents the mean of $f(s)$ when s is a sample of ground truth; $E_{t \sim P_{gi}} f(t)$ represents the mean of $f(t)$ when t is a sample generated by the generator; $\|f\|_L \leq 1$ represents the Lipchitz constant $\|f\|_L$ of $f(x)$ no more than 1; Pr is the distribution of NDCT image, $\lambda_i P_r$ refers to selection of $\lambda_i$ times the distributions of NDCT image; $P_{gi}$ represents the distribution of CT image generated by the ith generator; s and t are samples of $\lambda_i P_r$ and $P_{gi}$ respectively; $\|\ \|$ represents the Frobenius-2 norm; z represents the distribution of LDCT image; $L_{p1}$, $L_{p2}$ and $L_{p3}$ represent the pixel losses between the image generated by each generator and the corresponding preprocessed noise-added label image, while $\mu_1$, $\mu_2$ and $\mu_3$ are predefined weights for different pixel losses, with the effect of weighing the pixel losses;

4) The established adversarial network structure is trained, and then the actually sampled LDCT image is learned and processed.

The present invention has the beneficial effects that: the learning method of generative adversarial network (GAN) with multiple generators for image denoising provides a generative adversarial network with three generators. Such generators are used for removing Poisson noise, Gaussian blur noise and distortion noise respectively; the generators adopt the residual network structure. The mapped short connection used in the residual network can avoid the vanishing gradient problem in a deep neural network and accelerate the network training; the training of GAN is always a difficult problem due to the unreasonable measure between the generative distribution and real distribution. The present invention can stabilize training and enhance the robustness of training models by limiting the spectral norm of a weight matrix.

DETAILED DESCRIPTION OF THE PREFERRED EMBODIMENTS

1. Generative Adversarial Network (GAN)

Figure 1:
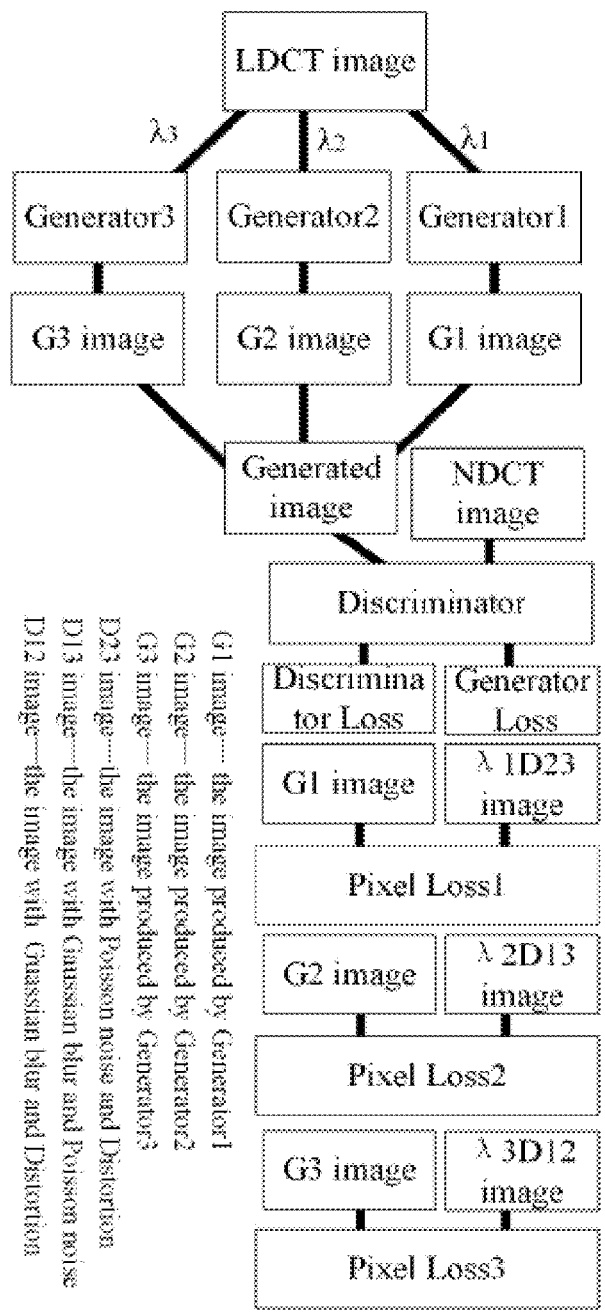
FIG. 1 is the structure view of the generative adversarial network with three generators of the present invention.

The generative adversarial network estimates the generative model through an adversarial process. The GAN network trains a pair of competition models at the same time: a generative model (G) which synthesizes the potential distribution of real data, and a discriminative model (D) which calculates the possibility that samples come from the real data rather than from the samples generated by the generative model (G). However, the loss function of GAN is in the form of Jensen-Shannon (JS) divergence, which is not persistently related to the parameters of the generator. Such an unreasonable measure leads to two serious problems in the process of GAN training: unstable gradient and mode collapse, which are also the root causes for the instability of GAN training. Therefore, Wasserstein-GAN (WGAN) replaces other popular distance measures by Earth-Mover (EM). The EM distance is continuous and differentiable almost everywhere. The WGAN function mainly uses the duality of Kantorovich-Rubinstein:

$$W(P_r, P_g) = \sup_{\|f\|_L \leq 1} [E_{x \sim P_r} f(x) - E_{x \sim P_g} f(x)] \quad (1)$$

where: $f(x)$ is the 1-Lipschitz function; $E_{x \sim P_r} f(x)$ represents the mean of $f(x)$ when x is a sample of ground truth; $E_x \sim P_g f(x)$ represents the mean of $f(x)$ when x is a sample generated by the GAN; $\|f\|_L \leq 1$ represents the Lipschitz constant $\|f\|_L$ of $f(x)$ no more than 1; $P_r$ is the distribution of real data, $P_g$ is the distribution of data generated by the GAN; sup is the supremum of a function; $W(P_r, P_g)$ is the EM distance of $P_r$ and $P_g$.

To achieve the Lipschitz constraint, WGAN will limit the weight to a certain range after each gradient update. Wasserstein GANs (WGAN-GP) limits the gradient by weight pruning. The present invention controls the Lipschitz constant by spectral normalization.

Nowadays, GAN gradually attracts wide attention in the field of medical image denoising. Both the generators and the discriminator can realize the denoising of the LDCT image by using the form of convolutional neural network. The WGAN and visual loss function are used to capture tiny textures and features. The generative adversarial network and the sharpness detection network are applied to obtain a tiny resolution loss and eliminate the effect of image blur.

2. Deep Residual Network

Since the neural network came out, the exploration of the network structure has been an important part of neural network research. The differences between different structures are gradually expanding as the number of layers of the convolutional neural network increases, and this trend also stimulates people to explore different connection modes. VGGNet increases the depth of network up to 16-19 layers by multilayer stacked small-size convolution kernels, so that the network can extract more complicated and representative features. GoogleNet designs a module called inception, which approximates an optimal local sparse structure and uses convolution kernels of different sizes to capture details of different scales. In addition, the use of a bottleneck layer greatly reduces the amount of computation.

A series of problems will appear as a deeper network begins to converge: the appearance of vanishing gradient/exploding gradient hinders the convergence rate of the network; the accuracy of the depth model on the training set reaches saturation, or even decreases a lot; in fact, the conv network only extracts a part of information of the image. Instead, a deeper network will lose more details of the image because the network only extracts a small number of features from the original image. The deep residual learning framework (ResNet) is proposed to solve the problem of deep neural network degeneration through short connection. The short connection can skip one or more neural layers and add the output directly to the final output of the stacking layer by identity mapping. The structure of short connection can transmit gradient information and keep more image information from previous layers. More importantly, neither additional parameters nor computational complexity are added by the residual structure. Experiments show that ResNet has higher accuracy than that of VGGNet and GoogleNet.

3. Image Denoising

Digital images play an important role in daily life. Images are widely applied in the fields of satellite television, object detection, face recognition and the like. Different types of noises and waxy artifacts are often introduced in the process of image acquisition. Therefore, denoising plays a more important role than other image processing in the field of digital images. Denoising is used to preserve the important information in the images and eliminate random noise as much as possible. Adaptive filtering automatically tracks the unknown situations to denoise non-stationary images. Wavelet transform studies signals through different windows or resolutions. A wavelet threshold is used to filter the Gaussian noise. BayesShrink uses soft threshold to minimize the Bayes risks. With the development of deep learning, more and more deep learning methods are applied to image denoising.

4. TriGAN

As everyone knows, the noise in CT images can be regarded as a combination of Poisson quantum noise, Gaussian blur and distortion. Therefore, the present invention regards the LDCT image as data of multi-distribution combination, that is, its distribution has a plurality of "peak values". To denoise the LDCT image more effectively, a parallel framework is proposed, so that an approximate distribution can be obtained to fit all the noises. TriGAN (multi-generator generative adversarial network) is based on WGAN (Wasserstein GAN). The difference is that the model consists of three different generators G1, G2, G3 (Generator1, Generator2, Generator3) and a discriminator D (Discriminator). With the sample x in the LDCT image as input, the model trains three generators to produce realistic images. The three generators G1, G2 and G3 pointedly remove the Gaussian blur, Poisson quantum noise and distortion noise respectively. The role of the discriminator D is similar to that in WGAN, which is to distinguish real and generated images. Both the generators and the discriminator are in the form of a neural network, and the parameters are independent for G1, G2 and G3. The present invention calls the model TriGAN, and the specific structure is shown in FIG. 1. The input is the LDCT image, and then it is correspondingly inputted into three generators according to the weights $\lambda_1$, $\lambda_2$ and $\lambda_3$ of the generators. If the first generator is aimed at the Gaussian blur noise, the G1 generated image enters the GAN discriminator D and the previously preprocessed $\lambda_1 D_{23}$ for calculation of the pixel loss, and adds the generated image from G2 and G3 to generate a new generator image, which, together with the NDCT image, is used as the input of the discriminator D. The same is true for the other two generators. The Poisson noise of the LDCT image data set is usually more than the distortion noise and Gaussian blur noise, and the Gaussian blur noise is more than the distortion noise, so the selection of $\lambda_1$, $\lambda_2$ and $\lambda_3$ presents the law of $\lambda_1 > \lambda_2 > \lambda_3$, but the sum is guaranteed to be 1. A variety of combination experiments have been tried, and a group with the best experimental index was selected by experience. $\mu_1$, $\mu_2$ and $\mu_3$ are set to achieve a balance between the loss value of the adversarial network and each pixel loss value.

For D12, D13, D23 and LDCT, a corresponding noise is added to the NDCT image. For example: Gaussian blur and Poisson noise are added to the NDCT image for D12, Gaussian blur and distortion noise are added to the NDCT image for D13. Poisson noise and distortion noise are added to the NDCT image for D23, and the LDCT image collects three types of noise. $D_{23}$ is a sample of image distribution with Poisson quantum noise and distortion added to the NDCT image where G1 is a generator for removing Gaussian blur noise; $D_{13}$ is a sample of image distribution with Gaussian blur and distortion added to the NDCT image where G2 is a generator for removing Poisson quantum noise; $D_{12}$ is a sample of image distribution with Gaussian blur and Poisson quantum noise added to the NDCT image where G3 is a generator for removing distortion noise.

Figure 2A:
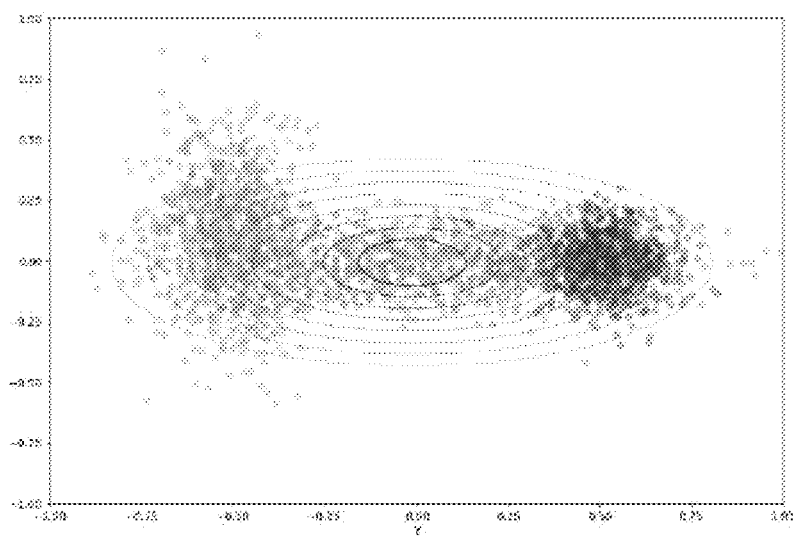
FIG. 2a is the noise distribution simulation view of a distribution model fitting.
Figure 2B:
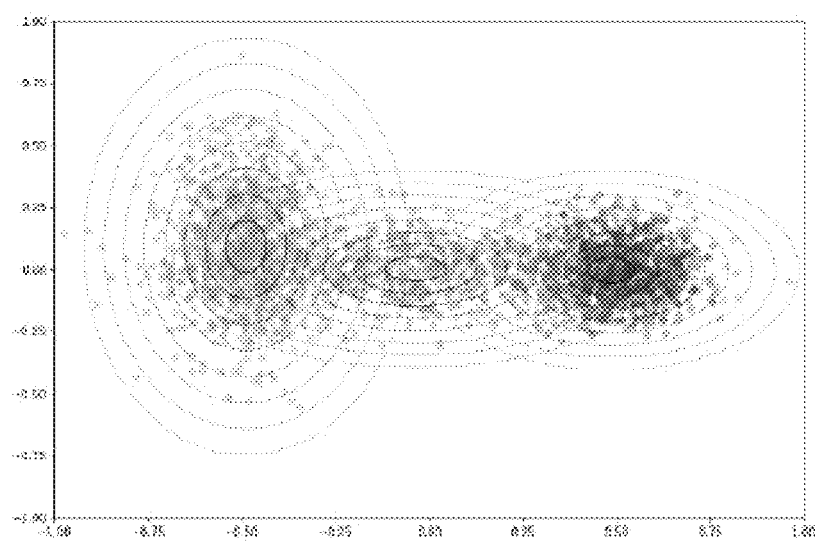
FIG. 2b is the noise distribution simulation view of the present invention.

4.1. In probability theory and statistical learning, random variables are often given specific probability values through several distributions. As shown in FIGS. 2a and 2b, different gray levels represent different noise distributions. It can be seen from FIG. 2a that only one distribution model cannot fit all the random variables well. Part of noise represented by gray is not included in the model. If a plurality of models are used to approximate the complex probability distribution, the effect is better by experience, as shown in FIG. 2b.

Hence, the present invention uses three generators to collect three types of image noise:

$$P(x|\theta_1, \theta_2, \theta_3) = \sum_{k=1}^{3} \pi_k P(x_k|\theta_k) \quad (2)$$

where $\pi_1+\pi_2+\pi_3=1$, $\pi_1$, $\pi_2$ and $\pi_3$ represent the mixing coefficients of the three generators respectively; $x_k$ is the internal parameter of the three generators (k=1, 2, 3), x represents the parameter when there is only one generator; $\theta_k$ is for different noise distributions. It makes the model fitting noise difficult due to the complex parameters and structures on the left of the equation. Therefore, the present invention uses a parallel network structure to fit the distribution of NDCT (Normal dose CT images) images better in the case that a plurality of noise distributions are known. That is to say, the performance of fitting noise with a plurality of models (three generators) is more excellent than that of fitting noise with a single model (one generator).

Theorem: Given the image distributions of LDCT and NDCT, the following optimization problem is actually solved:

$$W(P_r, P_g) = \sup_{P f P_L \leq 1} \sum_{i=1}^{3} \left[ E_{s \sim \lambda_i P_r} f(s) - E_{t : P_{gi}} f(t) \right] \quad (3)$$

where $\lambda_1+\lambda_2+\lambda_3=1$, $\lambda_1$, $\lambda_2$ and $\lambda_3$ represent the weight parameters of G1, G2 and G3 respectively; $\lambda_i P_r$ represents part of NDCT image distribution ($P_r$ is NDCT image distribution, $\lambda_i P_r$ here refers to selection of $\lambda_i$ times the distributions of NDCT image); $P_{gi}$ represents the distribution of CT images generated by the ith generator (i=1, 2, 3); s and t are samples of $\lambda_i P_r$ and $P_{gi}$ respectively.

Figure 3:
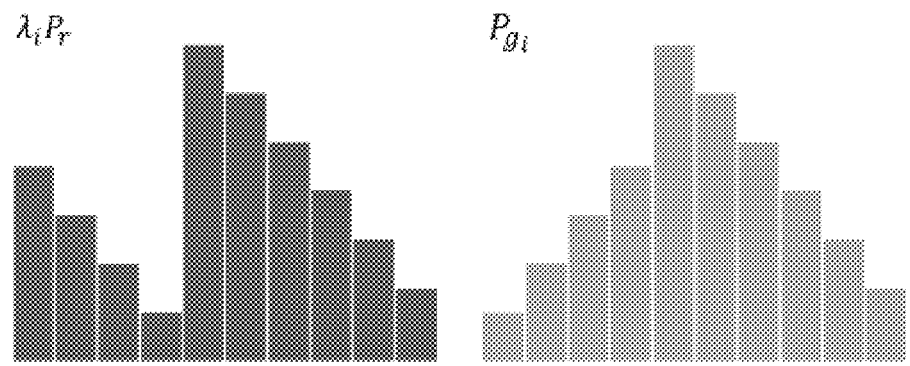
FIG. 3 is the view of I states of discrete distributions $\lambda_i P_r$ and $P_{gi}$ of the present invention in x and y regions.

Proof: As shown in FIG. 3, the discrete distributions $\lambda_i P_r$ and $P_{gi}$ have I states in x and y regions respectively, x and y are random variables in different spaces of $\lambda_i P_r$ and $P_{gi}$, the random variables have I states, namely that there are various probability states in different spaces, and there is a mapping relationship between two states in different spaces. There are many ways to transfer data from x field toy field in the experiment, and the goal is to find the optimal solution. According to the definition of Wasserstein distance, the optimization problem is converted into:

$$W(P_r, P_g) = \sum_{i=1}^{3} \inf_{\gamma_i \in \Pi} E_{(\lambda_i x, y_i) \sim \gamma_i} \|\lambda_i x - y_i\| \quad (4)$$

$y_i$ is a joint probability distribution, which is subject to $y_i \in \Pi(\lambda_i P_r, P_{gi})$ ($\Pi$ refers to the joint probability distribution of $\lambda_i P_r$ and $P_{gi}$, $y_i$ is subject to such distribution), $\|\lambda_i x - y_i\|$ represents Euclidean distance, inf represents the lower limit or the lowest bound. All constraints on the distribution $y_i$ can be replaced by an extra optimization based on the 1-Lipschitz function $f$:

$$W(P_r, P_g) = \sum_{i=1}^{3} \inf_{\gamma_i} \sup_{f} E_{(\lambda_i x_i y_i) \sim \gamma_i} [\|\lambda_i x - y_i\|] + \quad (5)$$

$$E_{s \sim \lambda_i P_r}[f(s)] - E_{t \sim P_{gi}}[f(t)] - (f(\lambda_i x) - f(y_i))]$$

s is a partial sample of $\lambda_i P_r$ distribution, and t is a partial sample of $P_{gi}$. $\lambda_i x$ is a partial probability distribution of $P_r$, and $y_i$ is another probability distribution. With the 1-Lipschitz function such as $f$, various constraints of joint distribution can be realized.

Using the minimax value principle, the above formula can be converted into:

$$W(P_r, P_g) = \sum_{i=1}^{3} \sup_{f} E_{s \sim \lambda_i P_r}[f(s)] - E_{t \sim P_{gi}}[f(t)] + \quad (6)$$

$$\inf_{\gamma_i} E_{(\lambda_i x, y_i) \sim \gamma_i} [\|\lambda_i x - y_i\| - (f(\lambda_i x) - f(y_i))]$$

Because the lower bound is that of a concave function, the Lipschitz continuous function $f$ can produce the same optimal solution. Therefore, we turn the above conditions into restrictions on the upper bound. The dual form of Wasserstein distance is:

$$W(P_r, P_g) = \sup_{P f P_L \leq 1} \sum_{i=1}^{3} \left[ E_{s : \lambda_i P_r} f(s) - E_{t : P_{gi}} f(t) \right] \quad (7)$$

4.2 Stability of Training

There are two inherent defects in GAN training: 1) Mode collapse, no matter what the input of the model is, the diversity of samples generated by the generator is limited, and the samples are even the same. 2) Drifting convergence, in which the discriminator is trained too perfectly. The generator cannot obtain effective gradient information although the generated data is distinguished from the target distribution. Therefore, the network is difficult to train. The present invention uses spectral normalization to improve this phenomenon. The spectral normalization constrains the spectral norm of the weight matrix of each layer, so that the Lipschitz constant is approximately equal to 1. As shown in the formula (8), we first initialize each weight vector $\tilde{\%}$ randomly. According to the principle of the power method, the first left and right singular vector can be obtained by observing the following rules:

$$\%_v \leftarrow W^T \%_u \left\| W^T \%_u \right\|_2, \%_u \leftarrow W \%_v \left\| W \%_v \right\|_2 \quad (8)$$

where W is a weight matrix, then this pair of approximate singular vectors is used in the experiment to approximate the spectral norm of W:

$$\sigma(W) \approx \%_u^T W \%_v \quad (9)$$

The spectral norm of each W is normalized:

$$\overline{W}_{SN}(W):=W/\sigma(W) \qquad (10)$$

Compared with other regularization methods, such as weight normalization and gradient penalty, spectral normalization can improve the quality of the generated image more effectively.

Figure 4:
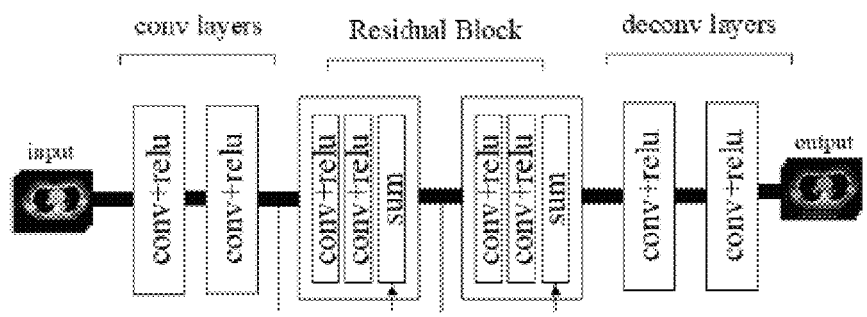
FIG. 4 is the network structure view of the generators of the present invention.

4.3 Network Structure:

1) Generator: As shown in FIG. 4, the generator, with an encoder-decoder symmetric structure, learns the end-to-end mapping from the LDCT image to the corresponding generated image directly. Two convolutional layers are superimposed at the front of the generator (the generator is regarded as a whole here, which means in the front of the interior of the generator). Similarly, two deconvolutional layers are nested at the network end-point. Residual blocks exist between convolutional layers and deconvolutional layers, and these residual blocks use short connection to solve the problem of network degeneration. Each convolutional layer uses small 3*3 convolutional kernels instead of convolutional kernels with larger sizes because the former has fewer parameters and better nonlinearity, and the network can cover a relatively large receptive field simultaneously. The first two convolutional layers of the generator network has 32 and 64 convolutional kernels, while the last two deconvolutional layers has 64 and 32 convolutional kernels. The input and output of the first residual block have 64 and 256 convolutional kernels, while the input and output of the second residual block have 256 and 64 convolutional kernels. All the neural network layers are trained stably through the RELU activation function.

Figure 5:
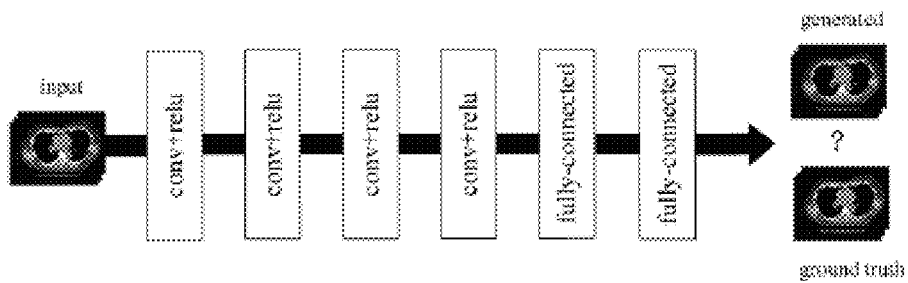
FIG. 5 is the network structure view of the discriminators of the present invention.

2) Discriminator: The discriminator is used to distinguish whether the input is an NDCT image or an image generated by three generators. As shown in FIG. 5, the discriminator has four successively connected convolutional layers, each of which has 32, 64, 128, 256 convolutional kernels. There are two fully connected layers at the network end-point of the discriminator, the first fully connected layer has 1,024 outputs, while the other fully connected layer has only one output. The sigmoid function is not used by the network model as the present invention adopts the Wasserstein distance.

3) TriGAN: The structure of TriGAN is shown in FIG. 1. To achieve good visual effects and quantitative analysis, the present invention defines a new loss function, which contains pixel-to-pixel Euclidean loss and adversarial loss. The pixel-to-pixel Euclidean loss (pixel loss) is mainly used to ensure the specificity and effectiveness of each generator for denoising. This process can be completed by comparing each pixel of the generated image with that of the image containing the other two noises. Specifically, Generator1 is trained for Gaussian blur, and the pixel loss between the G1 image generated by Generator1 and the image $D_{23}$ with Poisson quantum noise and distortion is minimized in the experiment. To keep the image generated by the generator and its corresponding preprocessed NDCT image as approximate as possible so that the discriminator is successfully cheated, the adversarial loss function (consisting of the generator loss and the discriminator loss) is minimized simultaneously in the experiment. The specific loss function is as follows:

$$Loss = L_a + L_{p1} + L_{p2} + L_{p3} \qquad (11)$$

$$L_a = \sup_{\|f\|_L \le 1} \sum_{i=1}^{3} \left[ E_{s \sim \lambda_i P_r} f(s) - E_{t \sim P_{gi}} f(t) \right] \qquad (12)$$

$$L_{p1} = \mu_1 E[\|G_1(\lambda_1 z) - \lambda_1 D_{23}\|_2] \qquad (13)$$

$$L_{p2} = \mu_2 E[\|G_2(\lambda_2 z) - \lambda_2 D_{13}\|_2] \qquad (14)$$

$$L_{p3} = \mu_3 E[\|G_3(\lambda_3 z) - \lambda_3 D_{12}\|_2] \qquad (15)$$

where $L_a$ represents adversarial loss function; $\|\ \|$ represents Frobenius-2 norm; z represents the distribution of LDCT image; $D_{23}$, $D_{13}$ and $D_{12}$ refer to samples with different noise distributions, the details are shown in FIG. 1; $L_{p1}$, $L_{p2}$ and $L_{p3}$ represent the pixel losses between the images (G1, G2, G3) generated by each generator and the existing preprocessed noise-added label image label images $((\lambda_1 D_n, \lambda_2 D_{13}, \lambda_3 D_{12})$, while $\mu_1$, $\mu_2$ and $\mu_3$ are predefined weights for different pixel losses, with the effect of weighing the pixel losses.

The invention claimed is:

1. A learning method of generative adversarial network (GAN) with multiple generators for image denoising, wherein a LDCT image represents a low-dose CT image, and a NDCT image represents a normal-dose CT image; characterized in that it specifically comprises the following steps:
   1) Constructing an adversarial network structure: The adversarial network comprises three different generators G1, G2, G3 and a discriminator D, wherein G1, G2 and G3 are generators for removing Gaussian blur noise, Poisson quantum noise and distortion noise respectively, and the discriminator D is used for distinguishing real and generated images; both the generators and the discriminator adopt the neural network structure, and G1, G2 and G3 adopt the residual network structure, with independent parameters;
   2) Generators: The LDCT image, serving as a sample, is correspondingly inputted into three generators according to the weights $\lambda_1$, $\lambda_2$ and $\lambda_3$ of the generators, wherein the generated image outputted by the G1 generator enters the discriminator D and preprocessed $\lambda_1 D_{23}$ for calculation of pixel loss, and also adds the generated images of G2 and G3 to generate a new generator image, which, together with the NDCT image, is used as the input of the discriminator D; the same is true for the other two generators;
   $D_{23}$ is a sample of image distribution with Poisson quantum noise and distortion added to the NDCT image where G1 is a generator for Gaussian blur denoising; $D_{13}$ is a sample of image distribution with Gaussian blur and distortion added to the NDCT image where G2 is a generator for Poisson quantum denoising; $D_{12}$ is a sample of image distribution with Gaussian blur and Poisson quantum noise added to the NDCT image where G3 is a generator for distortion denoising;
   3) Discriminator: To keep the image generated by the generator and its corresponding NDCT image as approximate as possible so that the discriminator is successfully cheated, the adversarial loss function $L_a$ (consisting of the generator loss and the discriminator loss) is minimized, and the loss function of the whole discriminator is as follows:

$$Loss = L_a + L_{p1} + L_{p2} + L_{p3}$$

$$L_a = \sup_{\|f\|_L \leq 1} \sum_{i=1}^{3} \left[ E_{s \sim \lambda_i P_r} f(s) - E_{t \sim P_{gi}} f(t) \right]$$

$$L_{p1} = \mu_1 E[\|G_1(\lambda_1 z) - \lambda_1 D_{23}\|_2]$$

$$L_{p2} = \mu_2 E[\|G_2(\lambda_2 z) - \lambda_2 D_{13}\|_2]$$

$$L_{p3} = \mu_3 E[\|G_3(\lambda_3 z) - \lambda_3 D_{12}\|_2]$$

where $L_a$ represents the adversarial loss function; $\lambda_1 + \lambda_2 + \lambda_3 = 1$; $f(x)$ is the 1-Lipschitz function; $E_{s \sim \lambda_i P_r} f(s)$ represents the mean of $f(s)$ when s is an authentic sample; $E_{t \sim P_{gi}}(t)$ represents the mean of $f(t)$ when t is a sample generated by the generator; $\|f\|_L \leq 1$ represents the Lipschitz constant $\|f\|_L$ of $f(x)$ no more than 1; Pr is the distribution of NDCT image, $\lambda_i P_r$ refers to selection of $\lambda_i$ times the distributions of NDCT image; $P_{gi}$ represents the distribution of CT image generated by the ith generator; s and t are samples of $\lambda_i P_r$ and $P_{gi}$ respectively; $\| \|$ represents the Frobenius-2 norm; z represents the distribution of LDCT image; $L_{p1}$, $L_{p2}$ and $L_{p3}$ represent the pixel losses between the image generated by each generator and the corresponding preprocessed noise-added label image, while $\mu_1$, $\mu_2$ and $\mu_3$ are predefined weights for different pixel losses, with the effect of weighing the pixel losses;

4) The established adversarial network structure is trained, and then the actually sampled LDCT image is learned and processed.

\* \* \* \* \*